United States Patent
Demura et al.

(10) Patent No.: US 9,850,874 B2
(45) Date of Patent: Dec. 26, 2017

(54) CONTROLLER OF INTERNAL COMBUSTION ENGINE WITH SUPERCHARGER

(75) Inventors: Takayuki Demura, Mishima (JP); Syuuji Yuda, Gotemba (JP); Yasuhiro Ooi, Numazu (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 414 days.

(21) Appl. No.: 14/386,385

(22) PCT Filed: Mar. 21, 2012

(86) PCT No.: PCT/JP2012/057188
§ 371 (c)(1),
(2), (4) Date: Sep. 19, 2014

(87) PCT Pub. No.: WO2013/140548
PCT Pub. Date: Sep. 26, 2013

(65) Prior Publication Data
US 2015/0047606 A1   Feb. 19, 2015

(51) Int. Cl.
*F02P 5/04* (2006.01)
*F02D 41/00* (2006.01)
(Continued)

(52) U.S. Cl.
CPC .......... *F02P 5/045* (2013.01); *F02D 41/0007* (2013.01); *F02D 41/0087* (2013.01);
(Continued)

(58) Field of Classification Search
CPC ........ F02P 5/045; F02P 5/1528; F02P 5/1516; F02P 5/1512; F02D 41/22; F02D 41/0007;
(Continued)

(56) References Cited

U.S. PATENT DOCUMENTS 4,304,200 A * 12/1981 Kromer .................. F02M 69/22
123/327
4,892,073 A * 1/1990 Yamamoto ............... F02P 11/06
123/406.14
(Continued)

FOREIGN PATENT DOCUMENTS

JP   61-192836 A   8/1986
JP   62-170754 A   7/1987
(Continued)

*Primary Examiner* — Sizo Vilakazi
*Assistant Examiner* — Brian Kirby
(74) *Attorney, Agent, or Firm* — Andrews Kurth Kenyon LLP (57) ABSTRACT

A controller of an engine with a supercharger includes, for each of cylinders, fuel supply system and an ignition plug. The controller includes an electronic control unit that is configured to: (i) set a basic ignition timing depending on an operation state of the engine, (ii) detect, for each cycle, an abnormal combustion generation cylinder in which an abnormal combustion is generated in a supercharged region, (iii) execute a fuel cut to stop a fuel supply by the fuel supply system for the abnormal combustion generation cylinder, (iv) change an ignition timing of the abnormal combustion generation cylinder to expand a crank angle width between a compression top dead center and the basic ignition timing for several cycles after start of the fuel cut, and (v) execute an ignition cut that prohibits a spark from being generated by the ignition plug, further after elapse of the several cycles is executed.

2 Claims, 6 Drawing Sheets (51) Int. Cl.
*F02P 5/15* (2006.01)
*F02P 5/152* (2006.01)
*F02D 41/22* (2006.01)
*F02D 41/34* (2006.01)
*F02D 35/02* (2006.01)

(52) U.S. Cl.
CPC ............ *F02D 41/22* (2013.01); *F02P 5/1516* (2013.01); *F02P 5/1528* (2013.01); *F02D 35/023* (2013.01); *F02D 41/008* (2013.01); *F02D 41/34* (2013.01); *F02P 5/1512* (2013.01); *Y02T 10/144* (2013.01); *Y02T 10/46* (2013.01)

(58) Field of Classification Search
CPC .... F02D 41/0087; F02D 41/34; F02D 35/023; F02D 41/008; Y02T 10/144; Y02T 10/46
USPC ................... 123/406.11–406.16, 299, 406.27
See application file for complete search history.

(56) References Cited

U.S. PATENT DOCUMENTS

| | | | | |
|---|---|---|---|---|
| 5,076,098 A | * | 12/1991 | Miwa | G01M 15/08 73/114.17 |
| 5,096,016 A | * | 3/1992 | Tada | B60K 28/16 180/197 |
| 5,136,996 A | * | 8/1992 | Kushi | F02D 37/02 123/332 |
| 5,546,905 A | * | 8/1996 | Fukui | F02P 5/045 123/406.41 |
| 6,371,074 B1 | * | 4/2002 | Keller | F02D 41/042 123/198 DB |
| 7,844,390 B2 | * | 11/2010 | Suzuki | F02D 17/02 701/112 |
| 2004/0200463 A1 | * | 10/2004 | Ando | F02P 11/06 123/630 |
| 2005/0120786 A1 | * | 6/2005 | Tsujimura | G01M 15/11 73/114.12 |
| 2005/0221952 A1 | * | 10/2005 | Tetsuno | F02N 11/0814 477/115 |
| 2006/0112932 A1 | * | 6/2006 | Toyoda | G01M 15/11 123/406.27 |
| 2008/0035132 A1 | * | 2/2008 | Katoh | F02D 41/0085 123/673 |
| 2009/0118977 A1 | * | 5/2009 | Whitney | F02D 37/02 701/103 |
| 2010/0068953 A1 | * | 3/2010 | Ito | B63H 21/265 440/86 |
| 2011/0017176 A1 | * | 1/2011 | Mizuno | F02D 41/221 123/486 |
| 2011/0130902 A1 | * | 6/2011 | Heisel | B60K 6/485 701/22 |

FOREIGN PATENT DOCUMENTS

| | | | |
|---|---|---|---|
| JP | 62168950 A | * | 7/1987 |
| JP | 62170754 A | * | 7/1987 |
| JP | 02-055876 A | | 2/1990 |
| JP | 06-147073 A | | 5/1994 |

* cited by examiner

CONTROLLER OF INTERNAL COMBUSTION ENGINE WITH SUPERCHARGER

CROSS-REFERENCE TO RELATED APPLICATIONS

This is a national phase application based on the PCT International Patent Application No. PCT/JP2012/057188 filed Mar. 21, 2012, the entire contents of which is incorporated herein by reference.

TECHNICAL FIELD

The present invention relates to a controller of an internal combustion engine with a supercharger.

BACKGROUND ART

An ignition plug is a device that electrically generates a spark in a spark ignition internal combustion engine and ignites a mixed gas. When a high voltage is applied between a center electrode of the ignition plug and a ground electrode, a discharge phenomenon in which insulation between electrodes is broken, a current flows and an electric spark is generated occurs. A voltage level necessary for forming the spark between the electrodes of the ignition plug (hereinafter referred to as ignition request voltage) tends to increase as an air-fuel ratio becomes lean. Therefore, during execution of fuel cut, the ignition request voltage becomes high.

Patent Document 1 discloses that during the fuel cut, the ignition request voltage becomes high and leakage tends to occur in an ignition circuit thereby. Further, for this problem, a controller that corrects an ignition timing to an advance angle side under the fuel cut condition and maintains the ignition request voltage at a low level thereby is disclosed. It is further disclosed that this correction of the ignition timing to the advance angle side is executed when the fuel cut condition continued a plurality of times.

The present inventors recognize documents described below including the document described above as ones associated with the present invention.

PRIOR ART DOCUMENTS

Patent Documents

Patent Document 1: Japanese Patent Application Publication No. 62-170754 (JP 62-170754 A)
Patent Document 2: Japanese Patent Application Publication No. 06-147073 (JP 06-147073 A)
Patent Document 3: Japanese Patent Application Publication No. 02-055876 (JP 02-055876 A)
Patent Document 4: Japanese Patent Application Publication No. 61-192836 (JP 61-192836 A)

SUMMARY OF THE INVENTION

Problem to be Solved by the Invention

Now, in the internal combustion engine with a supercharger, in a supercharged region (for example, a low rotation high load region), an abnormal combustion (a phenomenon in which a combustion starts earlier than the ignition timing and generates excessive cylinder internal pressure) such as unexpected preignition or the like tends to occur. In order to suppress the abnormal combustion from continuously occurring in a supercharged region, it is considered to execute a fuel cut. As described above, when the fuel cut is executed, the ignition request voltage becomes higher. Therefore, it is necessary to apply a measure for preventing the ignition request voltage from exceeding a withstand voltage of an entire ignition system (an ignition plug, a plug tube, respective joint parts and so on). As one of counter measures, it is also considered to advance the ignition timing like a controller of Patent Document 1.

Further, in the internal combustion engine with a supercharger, in the supercharged region, load based on an amount of air filled in the cylinder is higher than that of a non-supercharged NA (Natural Aspiration) engine. Therefore, a compression pressure becomes higher in comparison with the NA engine and also the ignition request voltage becomes higher thereby. As a result, higher ignition energy is required. Therefore, from the viewpoint of improvement of the fuel consumption, a further improvement is desired.

The present invention was carried out to solve the problems described above and has an object to provide a controller of an internal combustion engine with a supercharger, which can suppress the ignition request voltage from excessively rising and improve the fuel consumption when the fuel cut is executed to suppress the abnormal combustion from continuously occurring in the supercharged region.

Means for Solving the Problem

A first invention is, for achieving the object described above, a controller of an internal combustion engine with a supercharger, which includes, for each of cylinders, fuel supply means for supplying a fuel in the cylinder, and an ignition plug, characterized by including:

ignition timing setting means for setting a basic ignition timing for generating a spark by the ignition plug depending on an operation state of the internal combustion engine;

abnormal combustion generation cylinder detection means for detecting, for every cycle, an abnormal combustion generation cylinder in which an abnormal combustion occurred in a supercharged region;

fuel cut execution means for executing fuel cut to stop fuel supply with the fuel supply means for the abnormal combustion generation cylinder; and ignition control means during fuel cut execution for changing the ignition timing such that a crank angle width between a compression top dead center and the basic ignition timing is enlarged for several cycles after start of the fuel cut, and, further after elapse of the several cycles, executing an ignition cut that prohibits a spark from being generated by the ignition plug for the abnormal combustion generation cylinder.

Further, a second invention, in the first invention, is characterized by further including:

fuel supply amount setting means for setting a basic fuel supply amount of the fuel supply means depending on the operation state of the internal combustion engine; and fuel supply amount increase correction means for increasing and correcting the basic fuel supply amount during predetermined cycles for the abnormal combustion generation cylinder, wherein, the fuel cut execution means executes the fuel cut when the abnormal combustion is still generated in the abnormal combustion generation cylinder after elapse of the predetermined cycles.

Further, a third invention is characterized in that, in the first and second inventions, the fuel supply means includes an in-cylinder injector that directly injects a fuel into a cylinder and a port injector that injects the fuel into an intake port; and the fuel cut execution means executes the fuel cut of the predetermined cylinder from a cycle after a next cycle by increasing and correcting a fuel injection amount of the in-cylinder injector for the next cycle, when after the port injector starts a fuel injection for the next cycle, the abnormal combustion generation cylinder detection means detects that the predetermined cylinder is an abnormal combustion generation cylinder in the present cycle.

Effect of the Invention

According to the first invention, during several cycles after the start of the fuel cut, the ignition timing is changed such that the crank angle width between the compression top dead center and the basic ignition timing is enlarged. Therefore, in a state where in-cylinder pressure is low, ignition can be executed. Since the in-cylinder pressure is low, the ignition request voltage can be suppressed from excessively rising. In particular, it is effective in a supercharged engine because the in-cylinder pressure thereof is higher than that of the NA engine. Further, an untapped fuel remained in the cylinder can be stably burnt by the ignition. Further, according to the first invention, after elapse of the several cycles described above, further, the ignition cut that prohibits the spark from being generated due to the ignition plug is executed. Therefore, an improvement in the fuel consumption due to reduction of consumed power can be achieved. In particular, since the supercharged engine is high in the ignition energy compared with the NA engine, the ignition cut is effective for an improvement in the fuel consumption. Thus, according to the present invention, when the fuel cut is executed to suppress the continuous generation of the abnormal combustion in the supercharged region, the excessive rising of the ignition request voltage can be suppressed and an improvement in the fuel consumption can be achieved.

According to the second invention, regarding the abnormal combustion generation cylinder, the basic fuel supply amount is increased and corrected during the predetermined cycles. Further, after elapse of the predetermined cycles described above, when the abnormal combustion is still occurring in the abnormal combustion generation cylinder described above, the fuel cut is executed. Therefore, when the abnormal combustion is suppressed, due to A/F enrichment, from occurring, there is no need of execution of the fuel cut. Therefore, the abnormal combustion can be suppressed from occurring without risk of the high-voltage leakage.

According to the third invention, regarding the predetermined cylinder, when, after the port injector starts fuel injection for a next cycle, the predetermined cylinder described above is detected to be an abnormal combustion generation cylinder in the present cycle, the fuel injection amount of the in-cylinder injector for the next cycle described above is increased and corrected. Therefore, even when the fuel cut cannot be executed instantaneously, due to enrichment of the A/F, the abnormal combustion can be suppressed from occurring. Further, according to the third invention, the abnormal combustion can be more surely suppressed from occurring by executing the fuel cut from a cycle after the next cycle described above.

MODES FOR CARRYING OUT THE INVENTION

Hereinafter, embodiments of the present invention will be described in more detail with reference to the drawings. The like members common in the respective drawings are imparted with the like reference numerals and duplicating descriptions are omitted.

Embodiment 1

[System Structure of Embodiment 1]

Figure 1:
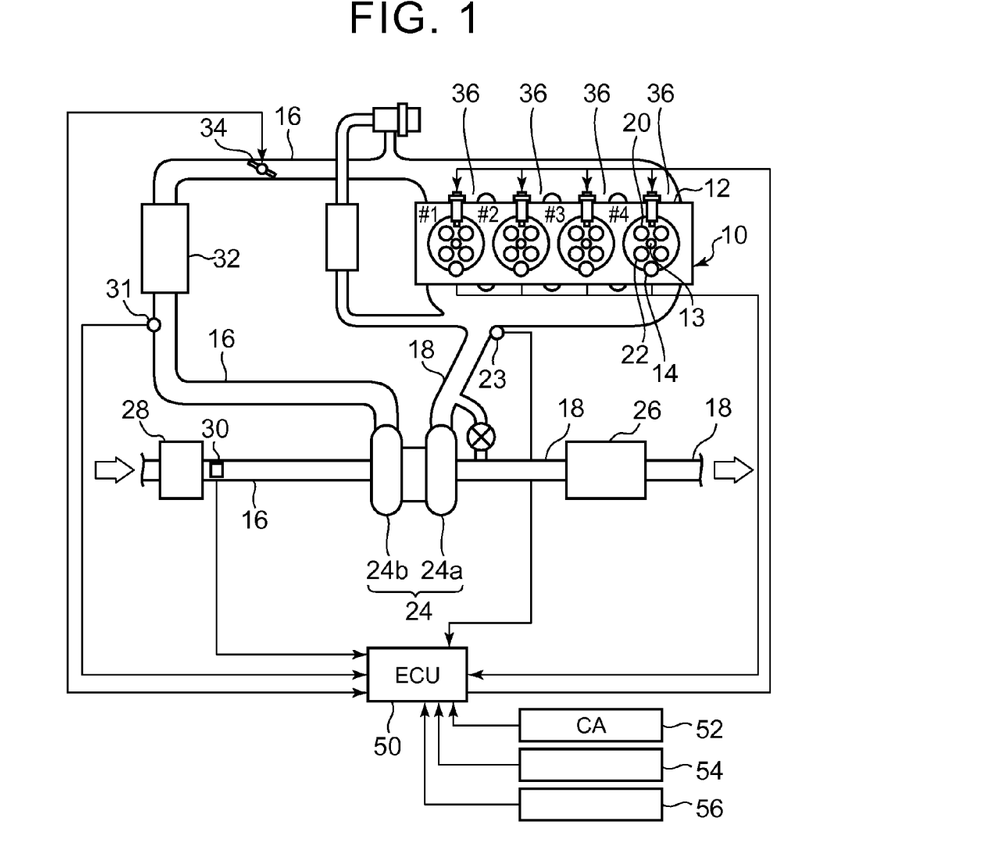
FIG. 1 is a conceptual diagram that expresses a system structure of Embodiment 1 of the present invention.

FIG. 1 is a conceptual diagram that expresses a system structure of Embodiment 1 of the present invention. A system shown in FIG. 1 includes an internal combustion engine (hereinafter, merely referred to also as engine.) 10 in which a displacement due to supercharge is downsized. The internal combustion engine 10 is mounted on a vehicle or the like and used as a power source thereof. Although the internal combustion engine 10 shown in FIG. 1 is an in-line four-cylinder type, in the present invention, the number of cylinders and a cylinder arrangement are not restricted thereto. For the purpose of convenience sake, in the following description, a first cylinder to a fourth cylinder are represented as #1 to #4, respectively.

Each of the cylinders of the internal combustion engine 10 includes an in-cylinder injector 12 that directly injects a fuel (for example, gasoline, ethanol) in a cylinder (combustion chamber), an ignition plug 13 that ignites a mixed gas, and, an in-cylinder pressure sensor 14 that outputs a signal in accordance with the in-cylinder pressure.

To each of the cylinders of the internal combustion engine 10, an intake passage 16 and an exhaust passage 18 are connected. At a downstream end of the intake passage 16, an intake valve 20 for opening/closing between the inside of the cylinder (combustion chamber) and the intake passage 16 is disposed. At an upstream end of the exhaust passage 18, an exhaust valve 22 for opening/closing between the inside of the cylinder (combustion chamber) and the exhaust passage 18 is disposed. In the vicinity of a meeting part of the exhaust passages 18, an air-fuel ratio sensor 23 for outputting a signal in accordance with an air-fuel ratio of the exhaust is disposed.

An exhaust gas discharged from each of the cylinders of the internal combustion engine 10 flows in the exhaust passage 18. The internal combustion engine 10 includes a turbocharger 24 that supercharges with energy of the exhaust gas. The turbocharger 24 includes a turbine 24a that is rotated with energy of the exhaust gas and a compressor 24b that is rotated by being driven by the turbine 24a. The turbine 24a is disposed in the exhaust passage 18 on a downstream of the air-fuel ratio sensor 23. The compressor 24b is disposed in the middle of the intake passage 16.

In the exhaust passage 18 on a downstream of the turbine 24a, a catalyst 26 for cleansing harmful components in the exhaust gas is disposed. As the catalyst 26, for example, a ternary catalyst is used.

In the vicinity of an inlet of the intake passage 16, an air cleaner 28 is disposed. Further, in the vicinity of a downstream of the air cleaner 28, an air flowmeter 30 that outputs a signal in accordance with a flow rate of air suctioned in the intake passage 16 is disposed. On a downstream of the air flowmeter 30, the compressor 24b is disposed. On a downstream of the compressor 24b, a supercharged pressure sensor 31 that outputs a signal in accordance with the supercharged pressure is disposed. On a downstream of the supercharged pressure sensor 31, an intercooler 32 is disposed. On a downstream of the intercooler 32, an electronic control type throttle valve 34 is disposed. On a downstream of the throttle valve 34, an intake port 36 is disposed for each of cylinders.

A new air suctioned through the air cleaner 28 is compressed by the compressor 24b of the turbocharger 24 and, thereafter, is cooled by the intercooler 32. The cooled new air passes through the throttle valve 34, is distributed to each of the cylinders and flows therein.

The system of the present embodiment further includes an electronic control unit (ECU) 50. The ECU 50 is formed of a processor that includes a memory circuit containing ROM, RAM and the like for example. On an input side of the ECU 50, other than the in-cylinder pressure sensor 14, the air-fuel ratio sensor 23, the air flowmeter 30, and the supercharged pressure sensor 31, which were described above, various sensors for detecting an operation state of the internal combustion engine 10 such as a crank angle sensor 52 for detecting a crank angle and a crank angle speed, a knock sensor 54 for detecting a knocking strength, a coolant temperature sensor 56 for detecting a temperature of a coolant water that cools the internal combustion engine 10 and the like are connected. On an output side of the ECU 50, various actuators for controlling an operation state of the internal combustion engine 10 such as the in-cylinder injector 12, the ignition plug 13, the throttle valve 34 and the like, which were described above, are connected.

The ECU 50 has a function of memorizing various data that vary depending on the crank angle as time-series data together with the relevant crank angle. This time-series data include various sensor outputs, various indices, parameters and the like, which are calculated on the basis of the relevant outputs.

The ECU 50 drives the various actuators in accordance with a predetermined program based on the various sensor outputs and controls the operation state of the internal combustion engine 10. For example, the crank angle and the engine speed are calculated based on the output of the crank angle sensor 52, and an intake air amount is calculated based on the output of the air flowmeter 30. Further, an engine load (load factor) is calculated based on the intake air amount, the engine speed and the like. A fuel injection amount is calculated based on the intake air amount, the load and the like. As a basic value of the fuel injection amount, a basic fuel injection amount (basic fuel supply amount) that sets, for example, an exhaust air-fuel ratio to a theoretical air-fuel ratio (stoichiometry) is set (a fuel supply amount setting function). The fuel injection timing and the ignition timing for electrically connecting to the ignition plug 13 are determined based on the crank angle. As a basic value of the ignition timing, a basic ignition timing corresponding to an operation region that is determined by the engine speed and the load is set (a basic ignition timing setting function). Then, when these timings come, the in-cylinder injector 12 and the ignition plug 13 are driven. Thus, the mixed air can be burnt in a cylinder and the internal combustion engine 10 can be driven thereby.

[Characteristic Control in Embodiment 1]

In the supercharged engine like a system of the present embodiment, in the supercharged region (for example, low rotation high load region), the abnormal combustion such as unexpected preignition or the like tends to occur. As an occurrence factor of the abnormal combustion, an oil mist and a deposit deposited in the combustion chamber and a piston can be cited. Continuous generation of the abnormal combustion becomes a factor that increases vibration or noise, and stress of the engine.

In order to prevent the abnormal combustion from continuously occurring, a measure for enriching the air-fuel ratio (hereinafter referred to merely as A/F in some cases) due to an increase in the fuel amount is considered. Due to the increase in a fuel amount, a compression end temperature is lowered due to a latent heat of evaporation of the fuel. Further, it is also considered to execute the fuel cut (hereinafter, merely referred to also as F/C). When the fuel cut is executed, an in-cylinder temperature is lowered by stopping combustion itself. Further, by executing these controls during predetermined cycles or a predetermined period, deposits peeled or floated by a shock wave of the preignition are discharged.

In the system of the present embodiment, when the continuous generation of the abnormal combustion cannot be stopped even by setting an A/F rich state, the fuel cut is executed. When the fuel cut is executed, the fuel is not injected. Therefore, the fuel in the cylinder is formed only of a wet part of the in-cylinder fuel and a wet part of a port fuel. As a result, an A/F lean state is generated. In the A/F lean state, since a fuel density is thin, the ignition request voltage of the ignition system rises. Therefore, the ignition request voltage may exceed the withstand voltage of an entire ignition system (ignition plug 13, plug tube, respective joint parts, and the like). When considering consumption expansion of a spark gap between a center electrode and a grounding electrode of the ignition plug 13 and product fluctuation, the withstand voltage of the entire ignition system is exceeded at a high probability. In particular, the situation becomes severe during a low-speed rotation when the supercharged pressure is high and the in-cylinder temperature is low.

When the withstand voltage is exceeded, a high-voltage leakage occurs at a part of the ignition system (pin-hole is generated). Therefore, after that, an inconvenience in which in a state returned from the fuel cut to a normal state, misfire may be caused is apprehended. Further, an inconvenience that due to the misfire, an untapped fuel and air flow in the catalyst 26, and the catalyst is melted at a high temperature due to an oxidation reaction is apprehended.

Further, in general, the supercharged engine is difficult to ignite and not good in combustibleness. That the supercharged engine is difficult to ignite is because the compression pressure is higher than that of the NA engine and also the ignition request voltage is higher than that. Although from the viewpoint of the combustibleness, a long term discharge is desired. However, many times of the ignition energy is necessary compared with that of the NA engine. Therefore, an improvement in the fuel consumption due to a reduction in a consumption power is desired. From such a background, in the present system, an improvement in the fuel consumption due to reduction in consumption power due to the ignition cut is sought. In the supercharged engine like the present system, a merit due to fuel consumption improvement due to the ignition cut is larger than that in the NA engine.

[Characteristic Control in Embodiment 1]

There, the controller of the internal combustion engine with the supercharger of the present embodiment executes the fuel cut of the abnormal combustion generation cylinder in which the abnormal combustion occurred in the supercharged region. Here, during several cycles after the start of the fuel cut, the ignition timing is changed such that the crank angle width between the compression top dead center and the basic ignition timing is expanded. Further, after elapse of the several cycles described above, the ignition cut is executed while continuing the fuel cut.

Desirably, preceding the fuel cut, the basic fuel supply amount described above of the abnormal combustion generation cylinder described above is increased and corrected during predetermined cycles. When even after elapse of the predetermined cycles described above, the abnormal combustion still occurs, the fuel cut is executed. When the abnormal combustion can be prevented by the A/F enrichment, there is no need of the execution of the fuel cut. Therefore, without the apprehension of the high-voltage leakage, the abnormal combustion can be suppressed.

More desirably, the control of changing the ignition timing described above is set to a control in which the ignition timing is retarded. Since, in the previous cycle in which the fuel cut is executed, since the basic fuel supply amount is increased and corrected, a fuel wet amount such as the wet part of the in-cylinder fuel and the wet part of the port fuel due to blowing-back is large. In order to suppress the ignition on an advance side from occurring when a large amount of the fuel wet part comes in the cylinder, the crank angle width is expanded toward the retard angle side. By largely retarding the ignition timing, a large amount of remaining fuel is burnt and an amount of an untapped gas is reduced thereby.

Figure 2:
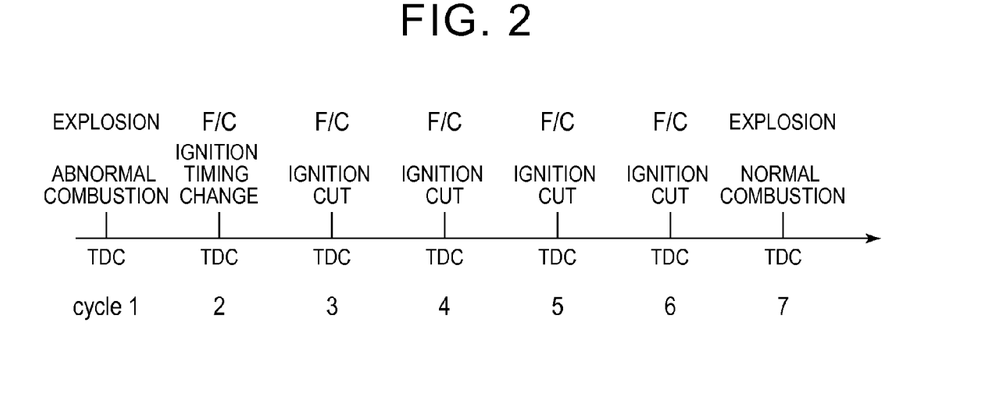
FIG. 2 is a time chart that shows an example of a characteristic control in the Embodiment 1 of the present invention.

An outline of the characteristic control in the system of the present embodiment will be described more specifically. FIG. 2 is a time chart that shows an example of the characteristic control in the system of the present embodiment. In an example shown in FIG. 2, firstly, in a cycle 1, the ECU 50 detects an abnormal combustion generation cylinder in which the abnormal combustion occurred in the vicinity of the compression top dead center (TDC). Next, in a cycle 2, the ECU 50 executes the fuel cut of the abnormal combustion generation cylinder and at the same time changes the ignition timing as described above. Thereafter, in a cycle 3, the ECU 50 executes the ignition cut while continuing the fuel cut. During cycle 4 to cycle 6, the fuel cut and the ignition cut are continued. In a cycle 8, a fuel cut restoration condition is satisfied, and, by restoring the normal state from the fuel cut, a normal combustion is performed.

Figure 3:
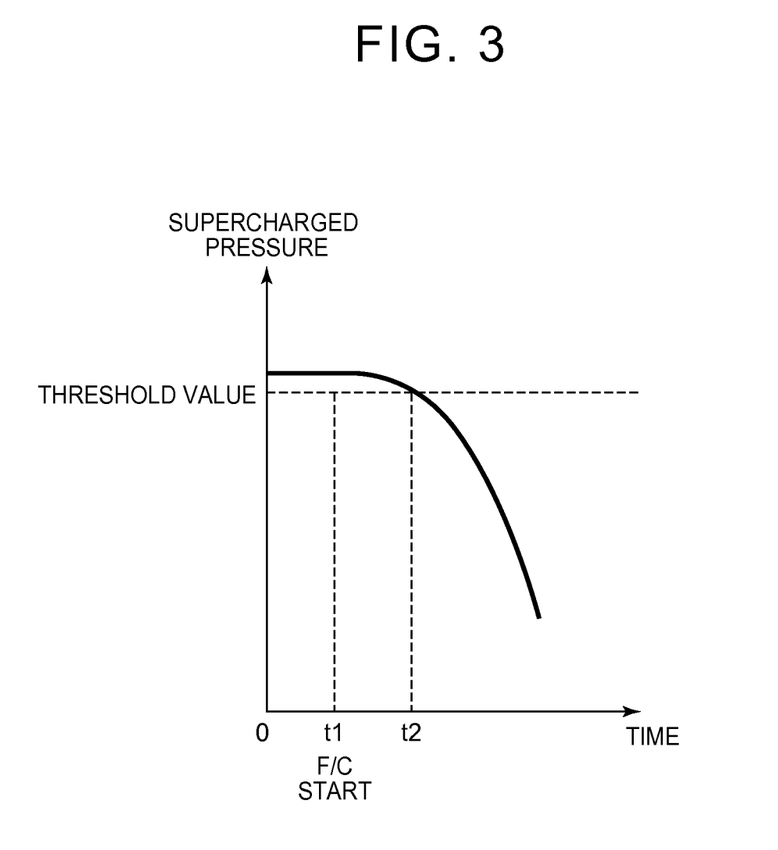
FIG. 3 is a diagram that shows a variation of supercharged pressure when a fuel cut is executed.

FIG. 3 is a diagram that shows a variation of supercharged pressure when a fuel cut is executed. As shown in FIG. 3, when an operation region is in the supercharged region, even if the fuel cut is executed at a time t1, during to a time t2, a state where the supercharged pressure is higher than a threshold value continues. The threshold value corresponds to the withstand voltage of the ignition system. A state in which the supercharged pressure is higher than the threshold value may continue during several cycles. Since the ignition request voltage is high during this several cycles, in the system of the present embodiment, the ignition timing is changed as described above. Thus, the high-voltage leakage can be suppressed from occurring.

Figure 4:
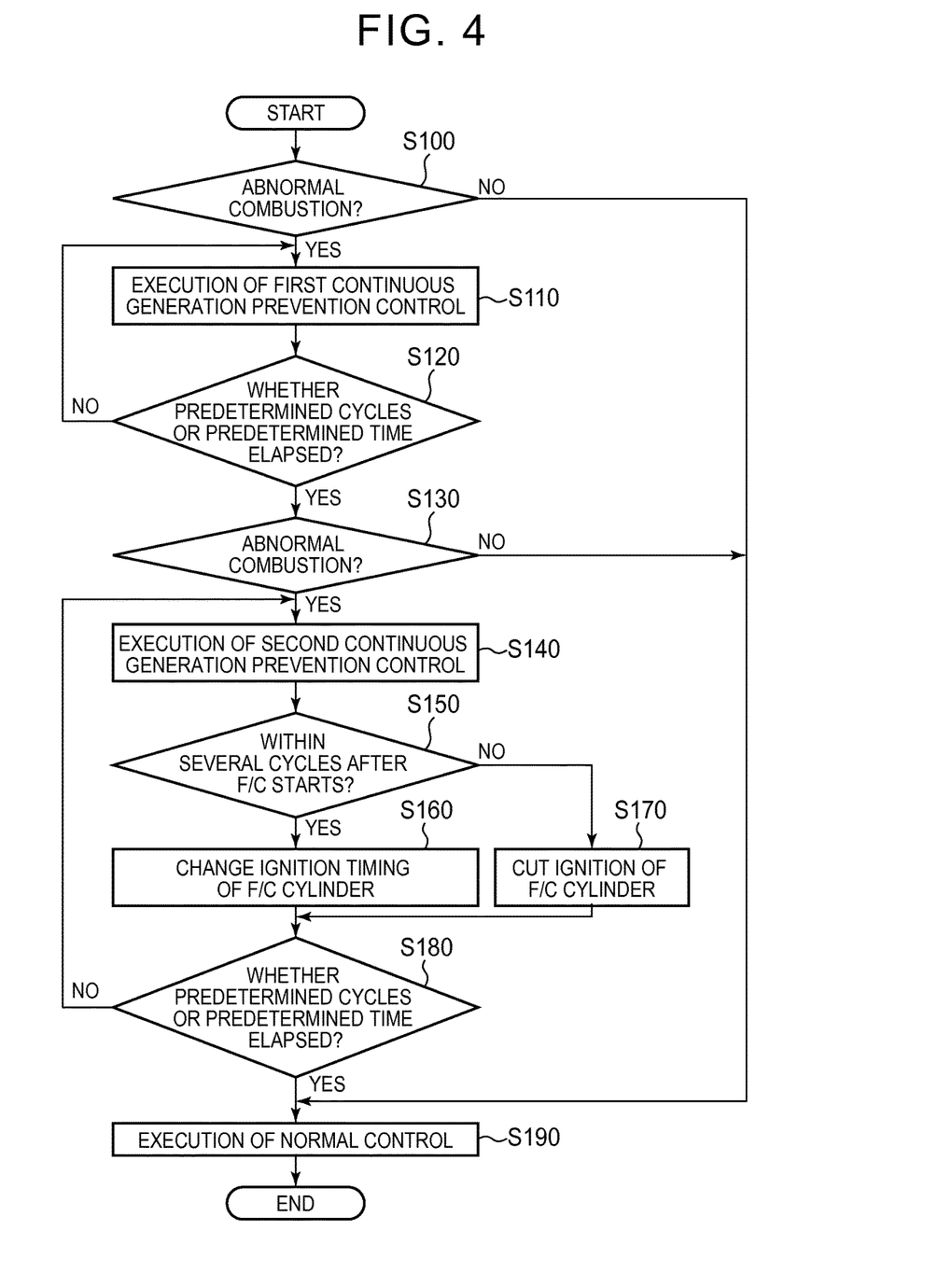
FIG. 4 is a flow chart of a control routine that an ECU 50 executes in the Embodiment 1 of the present invention.

FIG. 4 is a flow chart of a control routine that an ECU 50 executes to realize the operation described above. In the routine shown in FIG. 4, firstly, the ECU 50 determines whether the abnormal combustion occurred for each of the cylinders (step S100). For example, the ECU 50 determines whether the abnormal combustion such as the preignition or the like occurred based on the relationship between the crank angle at which the in-cylinder pressure sensor 14 or the knock sensor 54 outputted a peak value and the ignition timing. When the peak value was outputted at a crank angle that is advanced by a predetermined value or more than that during the normal combustion, it is determined that the abnormal combustion occurred. Further, when the MFB (Mass Fraction Burnt) 50% point is earlier by a predetermined value or more than that during the normal combustion, it can also be determined that the abnormal combustion occurred. When there is no occurrence of the abnormal combustion, the normal control is executed (step S190), a process of the present routine is terminated.

When it was determined that the abnormal combustion occurred in the Step S100, the ECU 50 executes a first continuous generation prevention control for suppressing the continuous generation of the abnormal combustion (step S110). In the first continuous generation prevention control, the basic fuel injection amount that is supplied in an abnormal combustion generation cylinder is increased and corrected. The A/F rich state can be achieved by increasing and correcting. For example, the air-fuel ratio is changed from 14.6 (stoichiometry) to 12. When it was determined that the abnormal combustion occurred in a plurality of cylinders during one cycle, the basic fuel injection amount is increased and corrected in all cylinders.

The ECU 50 determines whether the predetermined cycles or the predetermined time has elapsed after the first continuous generation prevention control was executed (step S120). When the predetermined cycles or the predetermined time has not elapsed, the process of the step S110 is resumed.

On the other hand, when predetermined cycles or the predetermined time has elapsed, the ECU 50 determines whether the abnormal combustion still continues in the abnormal combustion generation cylinder that was detected in the step S100, that is, whether the abnormal combustion continuously occurs (step S130). When the abnormal combustion is not generated, the normal control is executed (step S190), the process of the present routine is terminated.

When it is determined that the abnormal combustion continuously occurs in the step S130, the ECU 50 determines that the continuous generation of the abnormal combustion could not be suppressed by the first continuous generation prevention control. There, the ECU 50 executes a second continuous generation prevention control (step S140). In the second continuous generation prevention control, the fuel cut (F/C) that stops the fuel supply to the abnormal combustion generation cylinder described above is executed. When it was determined that the abnormal combustion occurred in a plurality of cylinders during one cycle, the fuel cut is executed in all cylinders.

The ECU 50 determines whether it is within several cycles after the start of the fuel cut (step S150). As the several cycles, for example, a time from execution start of the fuel cut until the supercharged pressure falls below the threshold value (FIG. 3) may be set in advance based on an experiment or simulation. Further, by determining whether the supercharged pressure fell below the threshold value for each cycle, when the supercharged pressure fell below the threshold value, the determination condition of the step S150 may be considered to be satisfied.

In the case of within the several cycles described above, the ECU 50 changes the ignition timing of the abnormal combustion generation cylinder in which the fuel cut is being executed (step S160). Specifically, the ECU 50 advances or retards the ignition timing such that a crank angle width from the compression top death center to the basic ignition timing is expanded. Since the in-cylinder pressure is determined by a crank position, the change of the basic ignition timing is performed not by a relative correction from the basic ignition timing but by an exchange of a map that determines the basic ignition timing. The ECU 50 has a corrected map in which basic ignition timings after correction, which correspond to the engine speed and the load, are determined and replaces the map in step S160. Further, desirably, a coolant temperature parameter is added in the corrected map. Since the lower the temperature in the cylinder is, the higher the ignition request voltage becomes, when considering the safeness, the lower the coolant temperature in a warming-up step (during cool time) is, the larger the advance or retard angle is set.

In the following description, the compression top dead center is expressed as 0°, a position advanced by 20° is expressed as 20BTDC, and a position retarded by 20° is expressed as 20ATDC. By replacing the map, for example, while the basic ignition timing corresponding to an operation region in the initial map is set to 5ATDC, in the corrected map, 20ATDC or 20BTDC can be set. The calculation of the basic ignition timing is executed at, for example, 240BTDC, and recalculation due to the corrected map is executed at, for example, 90BTDC. These calculations are executed by a routine separate from the fuel injection.

Until predetermined cycles or the predetermined time elapses after start of the fuel cut after the process of the step S160, the process of S140 is resumed (step S180). After that, when several cycles have elapsed from the start of the fuel cut and the determination condition of the step S150 is satisfied, the ECU 50 cuts the ignition of the cylinder during the fuel cut (step S170). After the start of the fuel cut, when predetermined cycles or the predetermined time have elapsed (step S180), the process is returned to the normal control from the fuel cut (step S180), and the present routine is terminated.

As described above, according to the routine shown in FIG. 4, firstly, the abnormal combustion suppression control due to the A/F enrichment is executed. In the case when the abnormal combustion is suppressed due to the A/F enrichment, there is no need of the fuel cut. Therefore, without apprehension of the high-voltage leakage, the abnormal combustion can be suppressed.

Further, by changing the ignition timing after the start of the fuel cut, the ignition can be executed under a state where the in-cylinder pressure is low. Since the in-cylinder pressure is low, the ignition request voltage can be suppressed from excessively rising. In particular, it is effective because the supercharged engine is high in the in-cylinder pressure than that of the NA engine. Further, the untapped fuel can be burnt by ignition. In particular, it is effective in the warming-up step (during cold time) because a fuel adhering amount (fuel wet amount) is large.

Further, during the fuel cut, the ignition cut can be executed. Therefore, an improvement in the fuel consumption due to reduction of consumption power can be achieved. In particular, the ignition cut is effective in an improvement in the fuel consumption because the supercharged engine is high in the ignition energy compared with that of the NA engine.

Thus, according to the system of the present embodiment, when the fuel cut is executed for suppressing the continuous generation of the abnormal combustion from occurring in the supercharged region in the internal combustion engine with the supercharger, suppression of excessive rise of the ignition request voltage and an improvement in the fuel consumption can be combined.

Now, in the system of the embodiment 1 described above, one in-cylinder injector 12 is provided for each cylinder. However, an arrangement and the number of the injectors are not limited thereto. For example, the in-cylinder injector and the port injector may be provided to each of the cylinders. Further, only the port injector may be provided.

Further, in the system of the embodiment 1 described above, the ECU 50 memorizes the corrected map that determines a relationship between the engine speed, the load, and the coolant temperature and the basic ignition timings. However, in place of the corrected map, fixed values (for example, 20ATDC) may be used.

In the embodiment 1 described above, the in-cylinder injector 12, the ignition plug 13, the basic ignition timing setting function, and a fuel supply amount setting function correspond to the "fuel supply means" in the first invention, the "ignition plug" in the first invention, the "ignition timing setting means" in the first invention, and the "fuel supply amount setting means" in the second invention, respectively.

Further, here, when the ECU 50 executes the processes of the steps S100 and S130 described above, the process of the step S110 described above, the process of the step S140 described above, and the processes of the step S150 to S170 described above, "the abnormal combustion generation cylinder detection means" in the first invention, "the fuel supply amount increase and correction means" in the second invention, "the fuel cut execution means" in the first invention, and "the ignition control means during fuel cut execution" in the first invention can be respectively realized.

Embodiment 2

[System Structure of Embodiment 2]

Next, Embodiment 2 of the present invention will be described with reference to FIG. 5 to FIG. 10. The system of the present embodiment can be realized by making the ECU 50 execute a routine of FIG. 7 described below in a structure shown in FIG. 5.

Figure 5:
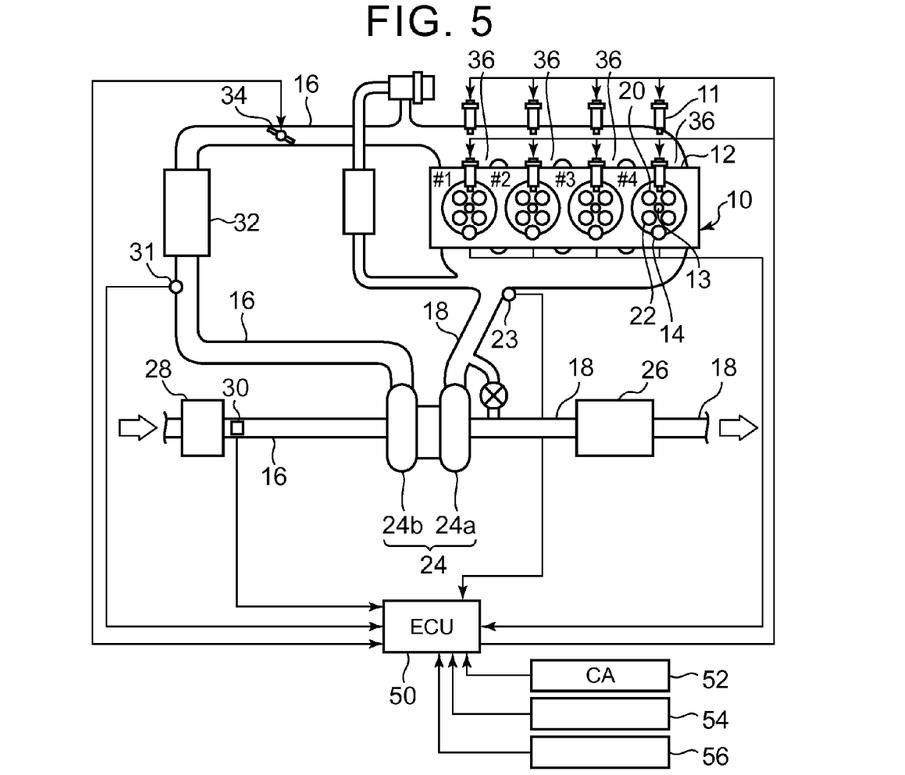
FIG. 5 is a conceptual diagram that expresses a system structure of Embodiment 2 of the present invention.

FIG. 5 is a conceptual diagram that expresses a system structure of Embodiment 2 of the present invention. The system of the present embodiment includes two injectors of the port injector 11 and the in-cylinder injector 12 for each cylinder. The port injector 11 is disposed in the intake port 36 and performs port injection of the fuel toward the inside of the cylinder (combustion chamber). The in-cylinder injector 12 injects the fuel directly into the cylinder (combustion chamber). Other main structures are the same as FIG. 1. Hereinafter, in FIG. 5, the like structures as FIG. 1 are imparted with the like reference numerals and descriptions thereof are omitted or simplified.

The ECU 50 of the present embodiment sets, depending on the operation state, for example, the basic fuel injection amount (a sum total of the fuel injection amounts of two injections) that makes the exhaust air-fuel ratio a theoretical air-fuel ratio (fuel supply amount setting function). Further, the fuel supply amount setting function calculates a fuel injection amount of the in-cylinder injector 12 and a fuel injection amount of the port injector 11 based on the basic fuel injection amount. These fuel injection amounts for the next cycle are calculated in an expansion step of the present cycle. Thereafter, the port injector 11 starts the fuel injection in the exhaust step, and the in-cylinder injector 12 starts the fuel injection in the intake step.

Now, regarding a predetermined cylinder, after the fuel injection amount of the port injector 11 is calculated and the port injector starts the fuel injection for the next cycle, there is a case in which the predetermined cylinder described above is detected to be the abnormal combustion generation cylinder in the present cycle. This is because when the abnormal combustion detection timing is late, the injection stop control to the port injector 11 is late, and there is a case in which the step cannot be transferred to the fuel cut. In this case, the fuel cut cannot be executed in the next cycle.

[Characteristic Control in Embodiment 2]

There, in the system of the present embodiment, regarding the predetermined cylinder, when the predetermined cylinder described above is detected to be the abnormal combustion generation cylinder in the present cycle after the port injector 11 starts the fuel injection for the next cycle in the exhaust step, the fuel injection amount of the next cycle described above of the in-cylinder injector 12 is increased and corrected. Then, the fuel cut is executed from a cycle after the next cycle described above.

Figure 6:
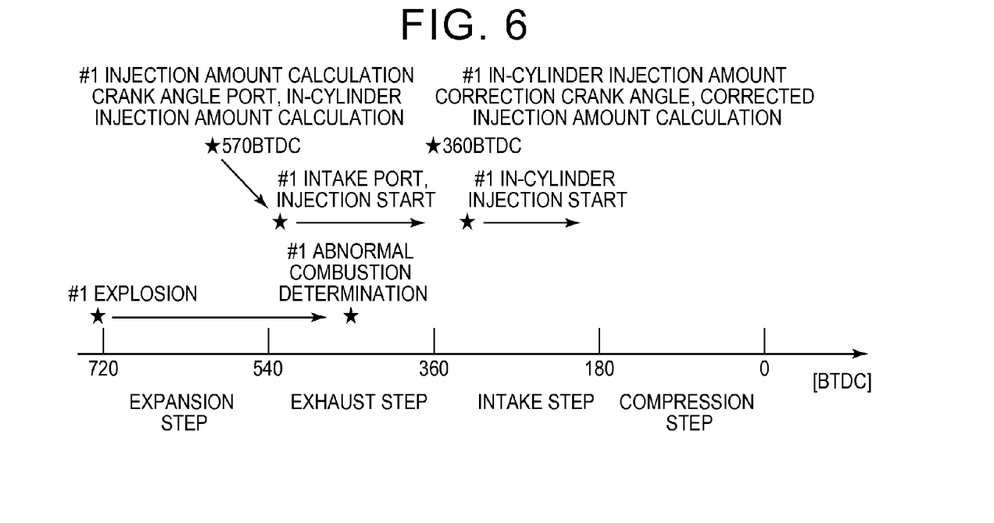
FIG. 6 is a time chart that shows an example of a characteristic control in the Embodiment 2 of the present invention.

An outline of the characteristic control in the system of the present embodiment will be more concretely described. FIG. 6 is a time chart that shows an example of a characteristic control in the system of the present embodiment. In the following description, the compression top dead center is expressed as 0° and a position advanced by 20° is expressed as 20ATDC.

In an example shown in FIG. 6, a timing (#1 injection amount calculation crank angle) at which the fuel injection amount of the port injector 11 and the fuel injection amount of the in-cylinder injector 12 of the first cylinder (#1) are calculated is earlier than a #1 abnormal combustion determination timing. Therefore, the execution of the fuel cut is late and the fuel injection by the port injector 11 of #1 is begun. In this case, the ECU 50 increases and corrects the fuel injection amount due to the in-cylinder injector 12 of #1. Due to the A/F largely enriched by this increase and correction, the compression end temperature is lowered.

Figure 7:
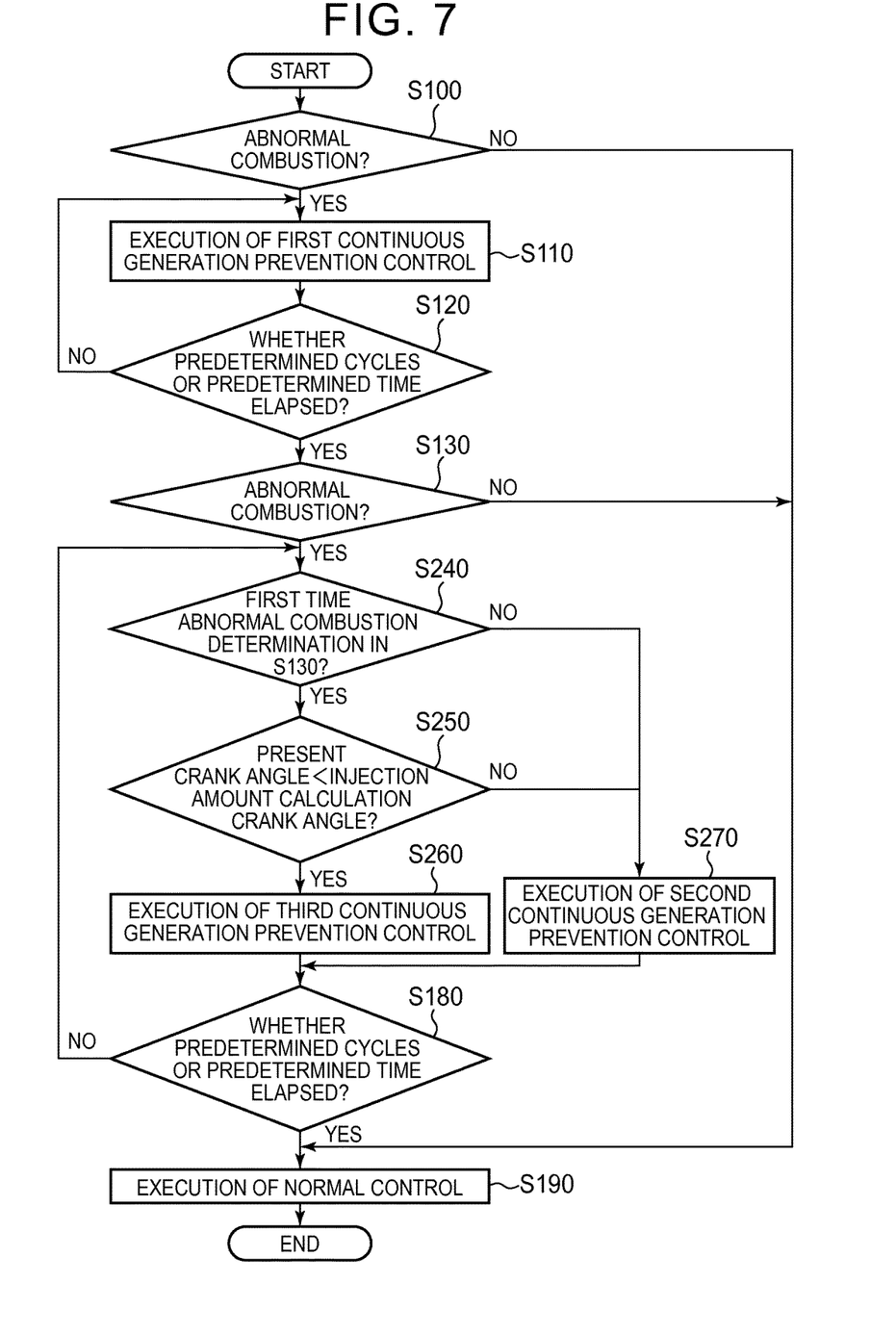
FIG. 7 is a flow chart of a control routine that the ECU 50 executes in the Embodiment 2 of the present invention.

FIG. 7 is a flow chart of a control routine that the ECU 50 executes for realizing the operation described above. This routine is the same as the routine shown in FIG. 4 except that processes from step S140 to step S170 are replaced by processes from step S240 to step S270. Hereinafter, in FIG. 7, the steps the same as those shown in FIG. 4 are provided with the same reference numerals and the descriptions thereof are omitted or simplified.

In the step S240, the ECU 50 determines whether detection of occurrence of abnormal combustion generation in the step S130 is the first time in the present routine. When it is the first time, the ECU 50 determines whether a present crank angle is on a retarded angle side than an injection amount calculation crank angle (step S250). In other words, the ECU 50 determines whether the injection amount calculation crank angle is earlier than the crank angle at which the abnormal combustion generation cylinder is detected. When this determination condition is satisfied, a third continuous generation prevention control is executed (step S260). The third continuous generation prevention control increases and corrects the fuel injection amount of the in-cylinder injector 12 set by the fuel supply amount setting function. Thus, an A/F rich state (for example A/F=10) more than the first continuous generation prevention control of the step S110 is set.

On the other hand, in the step S250, when the present crank angle is on an advance angle side than the injection amount calculation crank angle, at the present crank angle, the fuel injection amount of a next cycle of the port injector 11 has not been calculated. In this case, since the execution of the fuel cut fits the purpose, the second continuous generation prevention control described in the Embodiment 1 is executed.

Similarly, also when the determination condition is not satisfied in the step S240, the process of the step S250 is executed. This is because since one cycle has elapsed and the fuel cut fits the purpose.

As described above, according to the routine shown in FIG. 7, when the first continuous generation prevention control (A/F rich) cannot be instantaneously transferred to the second continuous generation prevention control (fuel cut), the fuel injection amount of the in-cylinder injector 12 can be increased and corrected. That is, the fuel injection amount that was increased and corrected in the first continuous generation prevention control can be further increased and corrected. Therefore, the compression end temperature can be further lowered due to the A/F enrichment, and as a result, the abnormal combustion can be suppressed from occurring. Further, even when the abnormal combustion occurred, there is an effect that the in-cylinder peak pressure is lowered, and vibration, noise and engine damage are weakened. Further, in a next cycle, by executing the fuel cut, the abnormal combustion can be more surely suppressed from occurring.

[Timing when Abnormal Combustion Generation Cylinder is Detected]

Figure 8:
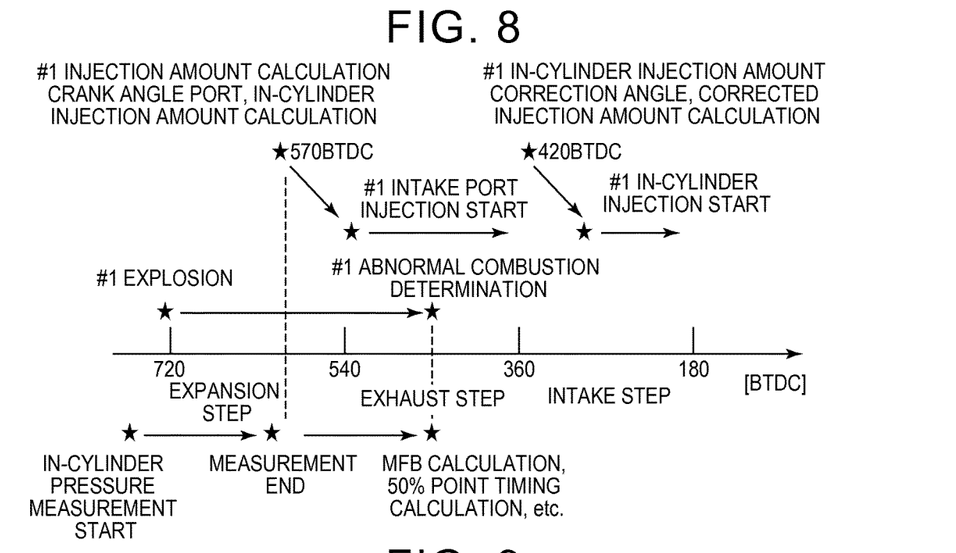
FIG. 8 is a diagram that shows an example in which an abnormal combustion generation cylinder is detected based on an MFB (Mass Fraction Burnt) 50% point.
Figure 9:
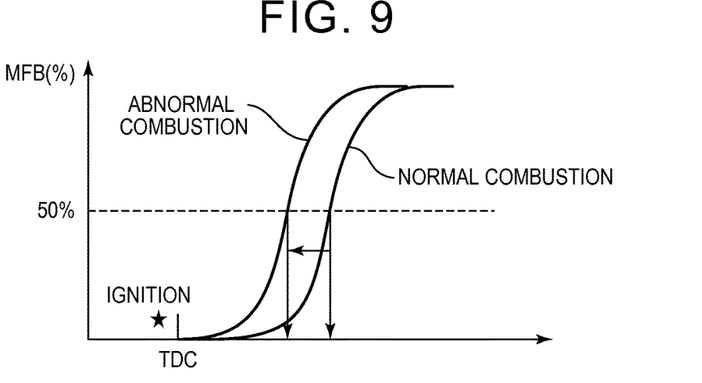
FIG. 9 is a diagram that shows an example in which the abnormal combustion generation cylinder is detected based on the MFB (Mass Fraction Burnt) 50% point.

The timing when the abnormal combustion generation cylinder described above is detected will be described with reference to FIG. 8 to FIG. 10. FIG. 8 is a diagram that shows an example in which an abnormal combustion generation cylinder is detected based on an MFB 50% point. As shown in FIG. 9, the abnormal combustion generation cylinder can be detected based on a difference between the MFB 50% points during a normal combustion and an abnormal combustion. In order to calculate the MFB (Mass Fraction Burnt) 50% point, it is necessary to measure the in-cylinder pressure until the combustion end with the in-cylinder pressure sensor 14. As a result, as shown in FIG. 8, in some cases, the MFB 50% point calculation timing becomes later than the injection amount calculation crank angle and the port injection start timing. Therefore the characteristic control of the present embodiment described above is effective.

Figure 10:
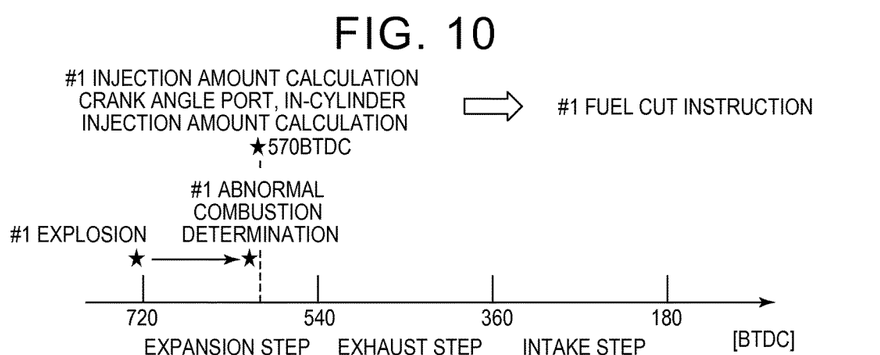
FIG. 10 is a diagram that shows an example in which the abnormal combustion generation cylinder is detected based on an in-cylinder peak voltage.

FIG. 10 is a diagram that shows an example that detects the abnormal combustion generation cylinder based on the in-cylinder peak pressure. As shown in FIG. 10, according to the detection due to the generation timing of the in-cylinder peak pressure, likelihood that the result of the abnormal combustion determination fits the purpose of the in-cylinder injection amount calculation crank angle is high. However, in the case of a low RON (Research Octane Number) fuel, likelihood of not fitting the purpose becomes higher because the abnormal combustion becomes on a retarded angle side. Therefore, the characteristic control of the present embodiment described above is effective.

Now, in the system of the Embodiment 2 described above, the port injector 11 and the in-cylinder injector 12 are provided to each cylinder. However, even a structure that does not include the in-cylinder injector 12 but includes only the port injector 11 can increase the fuel by an additional injection by injecting the fuel simultaneously with the intake step. Therefore, even to a structure that has only the port injector 11, the present invention can be applied.

Further, the routine of FIG. 4 in the system of Embodiment 1 can also be applied to the routine of FIG. 7 in the system of Embodiment 2 described above. Specifically, after the process of the step S270 of the routine of FIG. 7, processes of the step S140 and thereafter of the routine of FIG. 4 may be added.

In the Embodiment 2 described above, the port injector 11 and the in-cylinder injector 12 correspond to the "port injector" in the third invention and the "in-cylinder injector" in the third invention, respectively. Further, here, when the ECU 50 executes the processes of the step S240 to step S270 described above, the "fuel cut execution means" in the third invention is realized.

EXPLANATION OF REFERENCE NUMERALS

10/ INTERNAL COMBUSTION ENGINE (ENGINE)
11/ PORT INJECTOR
12/ IN-CYLINDER INJECTOR
13/ IGNITION PLUG
14/ IN-CYLINDER PRESSURE SENSOR
16/ INTAKE PASSAGE
18/ EXHAUST PASSAGE
20/ INTAKE VALVE
22/ EXHAUST VALVE
23/ AIR-FUEL RATIO SENSOR
24/ TURBOCHARGER
24*a*/ TURBINE
24*b*/ COMPRESSOR
26/ CATALYST
28/ AIR CLEANER
30/ AIR FLOWMETER
31/ SUPERCHARGED PRESSURE SENSOR
32/ INTERCOOLER
34/ THROTTLE VALVE
36/ INTAKE PORT
50/ ECU
52/ CRANK ANGLE SENSOR
54/ KNOCK SENSOR
56/ COOLANT TEMPERATURE SENSOR

The invention claimed is:

1. A controller of an internal combustion engine with a supercharger, which includes, for each of cylinders, fuel supply system for supplying a fuel in the cylinder, sensor for detecting a peak combustion value, and an ignition plug, the controller comprising:
   an electronic control unit configured to
   (i) set a basic ignition timing for generating a spark by the ignition plug depending on an operation state of the internal combustion engine;
   (ii) detect, based on the peak combustion value, for each cycle, an abnormal combustion generation cylinder in which an abnormal combustion is generated in a supercharged region;
   (iii) execute a fuel cut to stop a fuel supply by the fuel supply system for the abnormal combustion generation cylinder; and
   (iv) change an ignition timing to expand a crank angle width between a compression top dead center and the basic ignition timing for several cycles after start of the fuel cut, and
   (v) execute an ignition cut that prohibits the spark from being generated by the ignition plug, further after elapse of the several cycles, for the abnormal combustion generation cylinder, wherein
   the fuel supply system includes an in-cylinder injector that directly injects the fuel in the cylinder and a port injector that injects the fuel in an intake port; and
   the electronic control unit is configured to execute the fuel cut from a cycle after a next cycle by increasing and correcting a fuel injection amount for the next cycle of the in-cylinder injector when the electronic control unit detects that a predetermined cylinder is the abnormal combustion generation cylinder in a present cycle after the port injector starts a fuel injection for the next cycle for the predetermined cylinder.

2. The controller according to claim 1 wherein the electronic control unit is configured to:
   (i) set a basic fuel supply amount of the fuel supply system depending on the operation state of the internal combustion engine;
   (ii) increase and correct the basic fuel supply amount during predetermined cycles for the abnormal combustion generation cylinder,
   (iii) execute the fuel cut when the abnormal combustion is still generated in the abnormal combustion generation cylinder after the elapse of the predetermined cycles.

* * * * *